No. 751,652. PATENTED FEB. 9, 1904.
J. R. JONES & Q. CALLAWAY.
WINDLASS WATER ELEVATOR.
APPLICATION FILED OCT. 16, 1903.
NO MODEL.
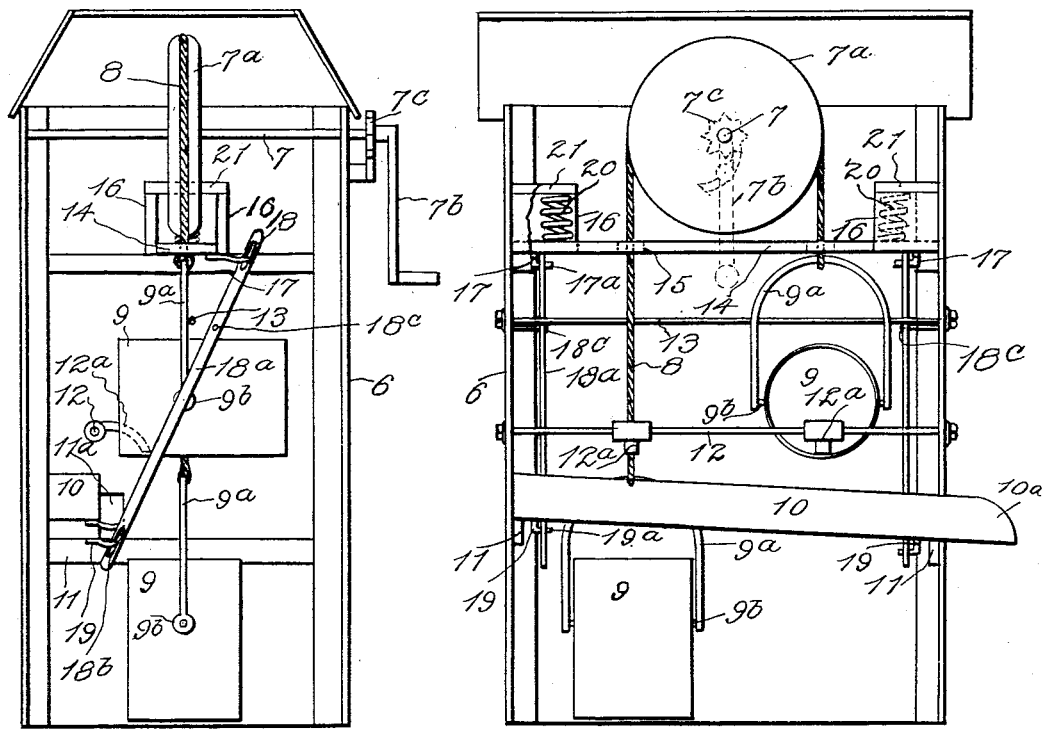

No. 751,652. Patented February 9, 1904.

UNITED STATES PATENT OFFICE.

JAMES ROBERT JONES AND QUINN CALLAWAY, OF HIGHLAND PARK, TENNESSEE.

WINDLASS WATER-ELEVATOR.

SPECIFICATION forming part of Letters Patent No. 751,652, dated February 9, 1904.

Application filed October 16, 1903. Serial No. 177,298. (No model.)

*To all whom it may concern:*

Be it known that we, JAMES ROBERT JONES and QUINN CALLAWAY, citizens of the United States, residing at Highland Park, in the county of Hamilton and State of Tennessee, have invented new and useful Improvements in Windlass Water-Elevators, of which the following is a specification.

Our invention relates to windlass water-elevators, and has for its object to provide simple and convenient means for drawing water from an ordinary well.

A further object is to provide means for preventing the water in the buckets from spilling back into the well as they are raised and emptied.

With this and other objects in view the invention consists in certain novel features of construction hereinafter described and claimed, and shown in the accompanying drawings, in which—

Figure 1 is a side elevation, and Fig. 2 an end elevation, the walls of the well-casing being removed. Fig. 3 is a plan view.

Referring specifically to the drawings, 6 represents the well-casing, near the top of which the shaft 7 of a pulley $7^a$ is mounted. The shaft extends through the casing on one side to the outside thereof, where it has a crank $7^b$ for turning it and a pawl and ratchet $7^c$ to prevent slipping. The pawl is double, so that the shaft will be prevented from slipping either way at the will of the operator. The pulley carries a rope or chain 8, from which the buckets 9 are suspended. The rope is fastened to a bail $9^a$, to which the bucket is pivoted, as at $9^b$. Each end of the rope carries a bucket, and one balances the other, so that the operator has only the weight of the water to lift.

At 10 is indicated a trough extending across the inside of the casing and having a discharge-spout $10^a$ on the outside thereof. The trough is loosely supported on strips 11 and extends through an opening $11^a$ in the casing, which is made somewhat wider than the trough itself for a purpose to be hereinafter described.

At 12 is indicated a rod extending across the casing and having fingers $12^a$. These fingers project into the path of the buckets, so as to engage them on the inside when they are raised and tilt them to discharge their contents, as shown in Fig. 2. In order that the buckets may be properly tilted to discharge their contents evenly, it is important to have the bails $9^a$ parallel with the side of the trough when the buckets are tilted. We attain this object by means of a rod 13, extending across the casing parallel with the side of the trough. This rod is above the rod 12 and in line with the bucket-bail, so that if either bucket should come up with the bail at an angle to the trough it will be righted by the rod 13 to extend parallel to the trough.

At 14 is indicated a horizontal bar extending across the casing below the pulley. This serves as a rope-guide, having holes 15, through which the same extends. The bar is loosely supported at its outer ends, so that it can be raised, its movement being guided by the vertical bars 16. The under side of the bar 14 carries a bracket 17, having a projecting finger $17^a$, which enters a slot 18 in the upper end of a lever $18^a$. A similar bracket 19 is secured to the trough, and its pin $19^a$ enters a slot $18^b$ in the lower end of the lever $18^a$. Two levers are used, as shown, and they are pivoted, as at $18^c$, to the casing. When the bucket is drawn up and its bail comes in contact with the bar 14, it will raise the same, causing the finger $17^a$ to swing the lever $18^a$ on its pivot. This will draw the trough toward the bucket. The opening $11^a$ in the casing permits this movement of the trough, it being wider than the same, as heretofore stated. Springs 20, interposed between the upper side of the bar 14 and arms 21, projecting from the casing, return said bar to its normal position when the bail is moved out of contact therewith as the bucket is lowered, causing the trough to return to its original position away from the bucket. This movement of the trough brings it close to the bucket and prevents its contents being spilled back into the well as it is tilted. In the drawings we have shown the position of one bucket when it is tilted, the trough not being drawn over as yet. It will be understood that a further winding of the rope will cause the bail to push the bar 14 up and move the trough forward by the instrumentalities heretofore described. It is usually advisable not to have the trough move until some of the contents of the bucket are discharged. This may be regulated as desired by locating the bar 14 higher or lower in the casing.

Having thus described our invention, what is claimed as new, and desired to be secured by Letters Patent, is—

1. A well-fixture comprising a casing, a trough therein extending to the outside, buckets, means for raising and tilting them to discharge into the trough, a vertically-movable bar extending across the casing and adapted to be raised by the buckets, a connection between the bar and trough to draw the latter toward the buckets when the bar is raised, and means for returning the parts to their normal position.

2. A well-fixture comprising a casing, a trough therein extending to the outside, buckets, means for raising and tilting the same to discharge into the trough, a vertically-movable bar extending across the casing and adapted to be raised by the buckets, a lever pivoted to the casing and having its ends connected to the bar and trough respectively to draw the latter toward the buckets when the bar is raised, and means for returning the parts to their normal position.

3. A well-fixture comprising a casing, a trough therein extending to the outside, buckets having pivoted bails, means for raising and lowering the buckets, a rod extending across the casing having fingers projecting into the path of the buckets to tilt them to discharge into the trough, and a rod across the casing in the path of the bails, and parallel to the trough, to right the buckets.

In testimony whereof we have signed our names to this specification in the presence of two subscribing witnesses.

JAMES ROBERT JONES.
QUINN CALLAWAY.

Witnesses:
H. C. HULSE,
J. G. BURTON.